Feb. 9, 1954
S. HUSACZKA ET AL
2,668,896
HEATER
Filed June 23, 1952
2 Sheets-Sheet 1
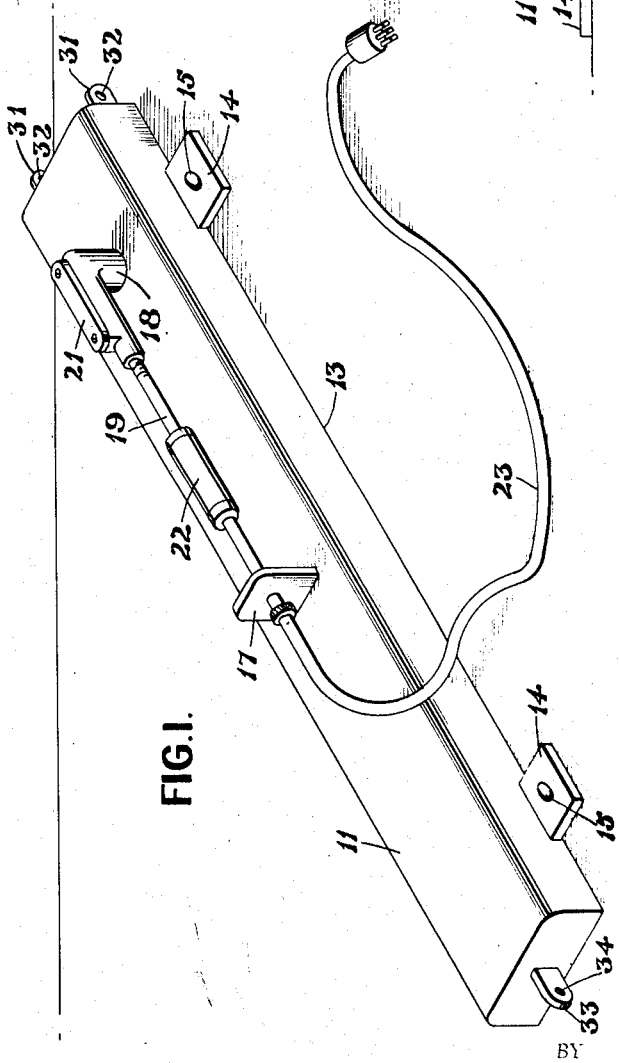
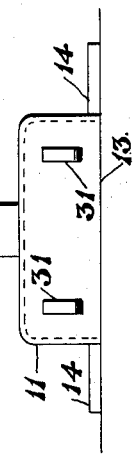
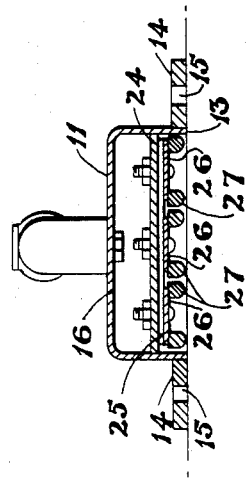
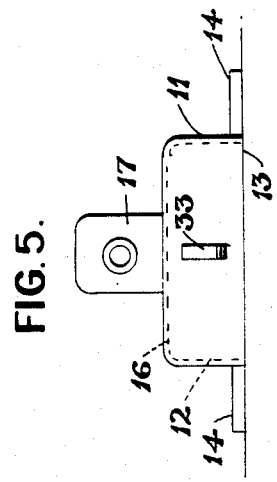
INVENTOR
STEPHAN HUSACZKA
HAYLETT M. JOHANSEN
NORMAN E. CARDINI
BY Lee J. Huntzberger
ATTORNEYS Feb. 9, 1954   S. HUSACZKA ET AL   2,668,896
HEATER
Filed June 23, 1952   2 Sheets-Sheet 2
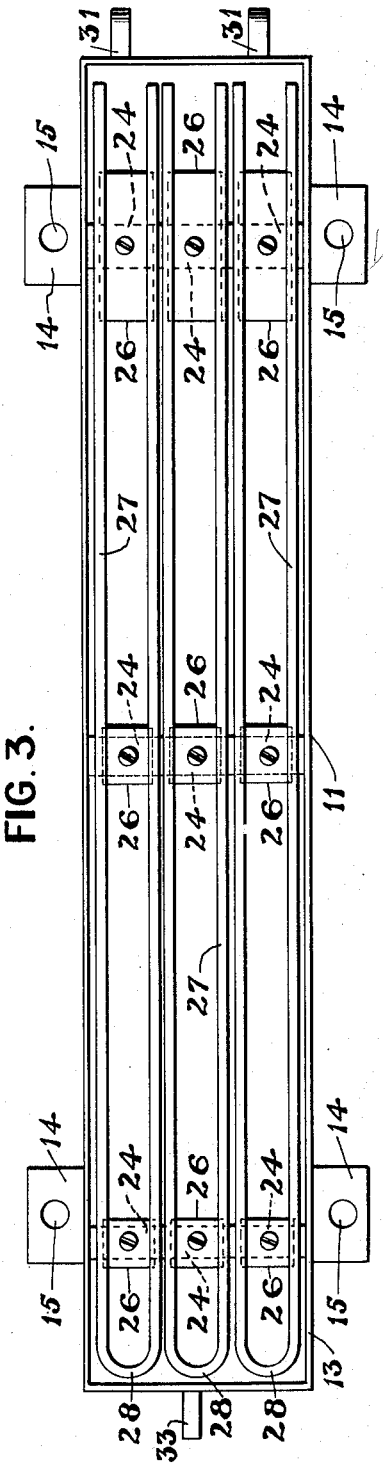
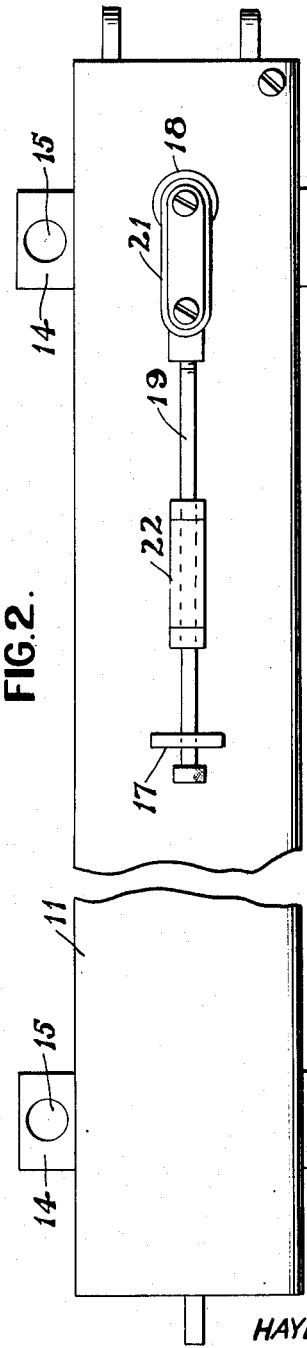
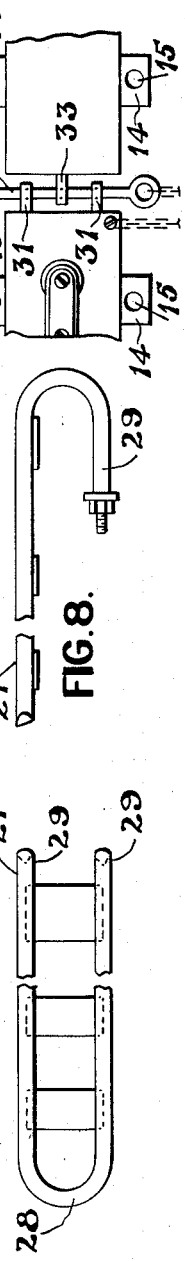
INVENTOR
STEPHAN HUSACZKA
HAYLETT M. JOHANSEN
NORMAN E. CARDINI
BY
*Lee J. Huntzberger*
ATTORNEYS Patented Feb. 9, 1954

2,668,896

UNITED STATES PATENT OFFICE 2,668,896

HEATER

Stephan Husaczka and Haylett M. Johansen, New York, N. Y., and Norman E. Cardini, Jersey City, N. J.

Application June 23, 1952, Serial No. 295,136

5 Claims. (Cl. 219—19)

(Granted under Title 35, U. S. Code (1952), sec. 266)

The invention described herein may be manufactured and used by or for the Government of the United States of America for governmental purposes without the payment of any royalties thereon or therefor.

The present invention concerns a heater and in particular concerns a heater for preheating plates that are to be welded. In welding steel plates it is necessary prior to the actual welding operation to preheat the plates in the area that is to be welded because of the fact that at the high temperatures involved in the welding operation there occurs buckling and warping of the plates if welded without any preheating treatment. In the case of small steel plates to be welded preheating can be accomplished in a soaking pit. However, large plates cannot be accommodated in soaking pits and it is therefore conventional practice in preheating large plates to provide heater units that are placed adjacent the areas of the plate to be welded. Such units are often required to be used for a period of 12 to 24 hours in order to preheat the plates to be welded to desired temperature.

Conventional heaters are made of iron and are so constructed that preheating of steel plates can be effected to only relatively low temperatures after a relatively long heating period. Also the shell or housing of such heaters absorbs a considerable quantity of heat which is therefore wasted so far as preheating the steel plate is concerned. In this connection a disadvantage arises from the fact that excessive absorption of heat by the shell results in buckling and warping of the shell.

The heater of this invention marks a distinct advance over previous heaters because of the fact that it can heat steel plates to a considerably higher temperature than conventional heaters and it can accomplish such heating in a shorter period of time than is customary with conventional heaters. Also there is little absorption of heat by the shell and there is no buckling and warping thereof.

An object of this invention is to provide a heater.

Another object is to provide a heater for preheating steel plates to be welded.

Another object is to provide a heater of this type having a shell that is made of aluminum and that does not absorb heat to the degree that conventional heaters absorb heat.

Another object is to provide a heater of this type in which the inside of the shell is substantially parabolic in transverse section and is highly buffed and polished whereby heat is reflected from the inside of the shell to the steel plates to be heated and such heat is not absorbed by the shell.

Another object is to provide a heater of this type in which the shape of the shell is such that it cannot distort or warp on heating.

Another object of this invention is to provide a heater comprising a plurality of individual heating units fastened together in chain-like fashion whereby the units can conform to the contour of steel plates that are not flat.

Other objects and many of the attendant advantages of this invention will be readily appreciated as the same becomes better understood by reference to the following detailed description when considered in connection with the accompanying drawings wherein:

Fig. 1 is an isometric view showing a preferred embodiment of heater,

Fig. 2 is a top view of the heater of Fig. 1,

Fig. 3 is a bottom view of the heater of Fig. 1,

Fig. 4 is an end elevation as seen from the right of Fig. 2,

Fig. 5 is an end elevation as seen from the left of Fig. 2,

Fig. 6 is a transverse section of the heater,

Fig. 7 is a fragmentary top view of a tubular heating unit forming a component of the heater, Fig. 8 is a fragmentary front elevation of the tubular heating unit of Fig. 7, Fig. 9 is a fragmentary top view showing two individual heaters coupled together in chain-like fashion, and Fig. 10 is a diagrammatic view showing the delta connection which characterizes the manner in which the individual tubular heating units are connected together in a heater.

In the drawing there is shown an individual heater comprising a dish-shaped shell 11. Preferably shell 11 is made of aluminum about $\frac{3}{16}$ of an inch thick with the shell being about 41 inches long and about 6¾ inches wide and about 3 inches deep. The inside 12 of shell 11 is substantially parabolic in transverse section and the inside 12 of shell 11 is buffed and polished to provide a heat reflecting surface. There is formed a rim 13 on shell 11 that is adapted to seat against a plate to be heated (not shown). Welded to rim 13 and flush therewith are pairs of opposed laterally extending lugs 14. Preferably lugs 14 are about ⅜ of an inch thick and are welded to rim 13 of shell 11 at each end of the shell for seating against a plate to be heated. Lugs 14 each have a hole 15 for receiving anchoring studs (not shown) from the plates to be heated. Each hole 15 is countersunk at the seating surface to accommodate a fillet where the stud is welded to a plate to be heated.

Formed on the outside of shell 11 near the middle thereof is a transverse bracket 17. Near one end of shell 11 is formed a cable opening 18. A conduit 19 extends through bracket 17 in spaced relation from the outside of shell 11 and to fitting 21 at cable opening 18. An insulated plastic hand grip 22 is mounted on conduit 19 between bracket 17 and fitting 21. A cable 23 extends through conduit 19 into shell 11.

Three transverse supports 24 of common length (measured in the direction of the length of shell 11) are fastened in shell 11 parallel to seating face 13 and spaced about ⅓ the distance from seating face 13 to the shell crown 16. Preferably transverse supports 24 are made of aluminum and are about $\tfrac{3}{16}$ of an inch thick. Supports 24 are located one in the middle and one near each end of shell 11. Mounted on each support 24 on the seating-face side is a gasket 25 that is preferably formed of asbestos about ⅛ of an inch thick.

Three base plates 26 are mounted side by side and transversely across each of the three asbestos gaskets. The base plates 26 are arranged in rows both transversely and longitudinally. Each base plate 26 is preferably formed of mild steel about $\tfrac{3}{16}$ of an inch thick. As seen in Fig. 3 base plates 26 adjacent fitting 21 are about three times the length (measured in the direction of the length of shell 11) of their support 24 whereas the other base plates 26 are about the same length as their supports 24.

Fastened on each longitudinal row of base plates 24 preferably by welding is a tubular heating unit 27 that is of substantially hairpin shape with the bend 28 at the end of shell 11 remote from fitting 21 and with leg ends 29 bent back under the end support 24 and base plates 26 adjacent fitting 21. Each tubular heating unit 27 is preferably made of helically wound Nichrome wire with the space between the inside of the tube and the Nichrome wire being packed with a granular refractory material resistant to heat.

Cable 23 extending through conduit 19 passes through opening 18 into the inside of shell 11 where it is connected to ends 29 of tubular heating units 27. As seen in Fig. 10, the three tubular heating units 27 are electrically connected by a delta 30.

Because base plates 24 at the end of shell 11 adjacent fitting 21 are elongated they are of sufficient dimension to shield the ends 29 of tubular heating units 27 and the connection with cable 23 against access from the rim portion of shell 11 to prevent short circuiting.

Provided at one end of shell 11 is a pair of spaced lugs 31 provided with aligned holes 32 and at the other end of shell 11 is a lug 33 provided with a hole 34. As seen in Fig. 9, a series of individual heating units 11 can be connected together by aligning ears 31 of one unit with ear 33 of the adjacent unit. A toggle pin 35 is passed through aligned openings 32 and 35 whereby the adjacent individual heating units 11 are connected together in chain-like fashion and are free to arrange themselves in conformance to a surface to be heated that is not flat.

In operation an individual heating unit 11 is disposed in trial position upon a plate to be heated. The location of lugs 14 is noted and the heating unit 11 is withdrawn. Studs are welded to the plates to be heated and the individual heating unit 11 is then placed in position with lugs 14 seated on such studs. Cable 23 is then connected to a suitable source of electrical power and the heating unit is allowed to remain in position for a sufficient length of time to heat the plate to the desired temperature. If desired a series of individual heating units 11 can be fastened together in chain-like fashion as indicated in Fig. 9 and the individual units can conform themselves to the shape of the plate or plates to be heated regardless of whether or not the plate or plates are flat.

In the event that it is necessary to gain access to the connection between cable 23 and ends 29 of tubular heating units 27, fitting 21 is removed from opening 18 of shell 11 and access is had through opening 18 to the desired area. Under no circumstances can a connection between cable 23 and ends 29 of tubular heating units 27 be accidentally contacted from the rim portion of shell 11 because of the fact that base plates 26 serve as a shield therefor.

It is an important feature of applicant's invention that the shell 11 absorb relatively little heat and therefor the use of aluminum is considered desirable. It is also an important feature of applicant's invention that the inside of shell 11 be parabolic in transverse section and highly buffed and polished whereby heat is reflected from the inside; the shape of shell 11 is such that it cannot distort or warp on heating. Also an important feature of the invention is coupling together of individual heaters 11 in chain-like fashion which allows the heaters to conform to the contour of plate that is not flat.

Obviously many modifications and variations of the present invention are possible in the light of the above teachings. It is therefore to be understood that within the scope of the appended claims the invention may be practiced otherwise than as specifically described.

We claim:

1. A heating device comprising an elongated shell, said shell on its inside being substantially parabolic in transverse section and being polished, a rim on said shell forming a seat, a support in said shell adjacent one end thereof, a tubular heating unit fastened to said support, said tubular heating unit being of hairpin shape with the bend at the end of the shell remote from said support, said tubular heating unit having its legs bent back under said support, and a cable connected to said legs under said support, said support forming a shield for the connection between said legs and cable against access from said rim.

2. A heating device comprising an elongated dish-shaped shell, said shell on its inside being substantially parabolic in transverse section and being polished, a rim on said shell forming a seating face, a plurality of laterally extending lugs formed at said rim, said shell having an opening at one end thereof, a handle on the outside of said shell, a plurality of tubular heating units fastened to said supports, each tubular heating unit being of hairpin shape, and a cable extending into said shell through said opening and connected to the ends of said tubular heating units, said supports forming a shield for the end of said tubular heating units and said cable against access from said rim.

3. A heating device for preheating plates to be welded, said device comprising a plurality of individual heaters, each individual heater comprising a dish-shaped shell, said shell being elongated, the inside of said shell being substantially parabolic in transverse section and being buffed and polished to provide a high heat reflecting surface, a rim on said shell adapted to seat against a plate to be heated, pairs of opposed laterally extending lugs welded to the rim of said shell at each end of said shell for seating against a plate to be heated, said lugs having holes for receiving anchoring studs from the plates being heated, said holes being countersunk at the seat face to accommodate a fillet where the stud is welded to a plate to be heated, said shell having an opening at one end thereof, a transverse bracket on the outside of said shell near the middle thereof, a conduit extending from said opening through said bracket in spaced relation from the outside of said shell, an insulated handgrip on said conduit, a cable extending through said conduit into said shell, a plurality of transverse supports fastened in said shell parallel to the seating face and spaced about one-third the distance from the seating face to the shell crown, said supports being located one in the middle and one near each end of said shell, a gasket on the seating face side of each support, a plurality of base plates one on each gasket, said base plates forming a plurality of longitudinal rows, a plurality of tubular heating units of helically wound Nichrome wire, said units being in parallel relation and fastened to the rows of base plates, each tubular heating unit being of substantially hairpin shape with the bend at the end of the shell remote from the shell opening and the leg ends being bent back under the aluminum support at the shell opening end of said shell, said cable extending in said shell and being connected to the ends of said tubular heating units, said base plates at the shell opening end of said shell being of area sufficient to shield the ends of said tubular heating units and said cable against access from the rim portion of said shell to prevent short circuiting, at least one end lug at each end of said shell with a transverse hole through said lug, the plurality of individual heaters being arranged end-to-end with the end-lug holes in alignment, and a toggle pin extending through the end lugs in adjacent heaters.

4. A heating unit comprising a shell having a rim forming a seat for said shell, a support in said shell, an elongated heating unit formed into at least one planar convolution, said elongated heating unit having its free ends bent back under said support, and a cable connected to said legs under said support, said support forming a shield for the connection between said legs and cable against access from the rim of the shell.

5. A heating unit comprising a shell having a rim forming a seat for said shell, a support in said shell adjacent one end thereof, a tubular heating unit fastened to said support, said tubular heating unit being of hairpin shape with the bend at the end of the shell remote from said support, said tubular heating unit having its legs bent back under said support, whereby the legs of said heating unit are adapted to be connected to a cable with the support forming a shield for such connection against access from the rim.

STEPHAN HUSACZKA.
HAYLETT M. JOHANSEN.
NORMAN E. CARDINI.

References Cited in the file of this patent

UNITED STATES PATENTS

| Number | Name | Date |
|--------|------|------|
| 423,966 | Thomson | Mar. 25, 1890 |
| 430,839 | Dewey | June 24, 1890 |
| 485,017 | Ries | Oct. 25, 1892 |
| 2,495,513 | Doyle | Jan. 24, 1950 |